(12) United States Patent
Schermann et al.

(10) Patent No.: US 11,752,569 B2
(45) Date of Patent: Sep. 12, 2023

(54) METHOD FOR DETECTING AND PROCESSING DEFINED CONTOURS DURING SEVERING OF A SOLID BODY BY MEANS OF A HIGH-ENERGY BEAM

(71) Applicant: Siemens Aktiengesellschaft, Munich (DE)

(72) Inventors: Aleksandra Schermann, Leinfelden-Echterdingen (DE); Ralf Spielmann, Stuttgart (DE); Michael Krutzke, Sindelfingen (DE)

(73) Assignees: Siemens Aktiengesellschaft, Munich (DE); Trumpf Werkzeugmaschinen SE + Co. KG, Ditzingen (DE)

( * ) Notice: Subject to any disclaimer, the term of this patent is extended or adjusted under 35 U.S.C. 154(b) by 599 days.

(21) Appl. No.: 16/616,271

(22) PCT Filed: May 23, 2018

(86) PCT No.: PCT/EP2018/063432
§ 371 (c)(1),
(2) Date: Nov. 22, 2019

(87) PCT Pub. No.: WO2018/215500
PCT Pub. Date: Nov. 29, 2018

(65) Prior Publication Data
US 2020/0086419 A1    Mar. 19, 2020

(30) Foreign Application Priority Data
May 23, 2017 (EP) .................................. 17172421

(51) Int. Cl.
*B23K 15/02* (2006.01)
*B23K 10/00* (2006.01)
(Continued)

(52) U.S. Cl.
CPC ............ *B23K 15/02* (2013.01); *B23K 10/006* (2013.01); *B23K 26/032* (2013.01); *B23K 26/044* (2015.10); *G05B 19/402* (2013.01)

(58) Field of Classification Search
CPC .... B23K 15/02; B23K 26/044; B23K 10/006; B23K 26/032; B23K 26/38; B23K 26/03; G05B 19/402; G05B 2219/45041
See application file for complete search history.

(56) References Cited

U.S. PATENT DOCUMENTS 4,986,664 A * 1/1991 Lovoi .................. B23K 26/032
　　　　　　　　　　　　　　　　　219/121.68
5,589,090 A * 12/1996 Song ....................... B27M 1/06
　　　　　　　　　　　　　　　　　219/121.75
(Continued)

FOREIGN PATENT DOCUMENTS

CN      101628359 A      1/2010
CN      103347642 A      10/2013
(Continued)

OTHER PUBLICATIONS

Power Automation GMBH: "Schlüsselfertige Lösung für Laserschneidmaschinen", pp. 1-11, XP055419933, gefunden Im Internet: URL:https://www.powerautomation.de/fileadmin/downloads/Brochures_PA9000/DE/PA_Solution_Laser_WEB_DE_20170831.pdf, gefunden am-2017-10-27, pp. 12, 13: 2016.
(Continued)

*Primary Examiner* — John J Norton
*Assistant Examiner* — Franklin Jefferson Wang
(74) *Attorney, Agent, or Firm* — Henry M. Feiereisen LLC

(57) ABSTRACT

In a method for severing a solid body, a defined contour is stored in a control unit configured to detect contour breaches and to avoid contour breaches. A high-energy beam is moved along a contour on a surface of the solid body, with
(Continued)

the surface of the solid body facing the high-energy beam, to produce with the high-energy beam a cutting gap. The contour on the surface is compared with the defined contour stored in the control unit, and avoidance of the contour breach is automatically deactivated when the contour on the surface of the solid body matches the defined contour and a contour breach is detected. Otherwise, the contour is omitted. Advantageously, the high-energy beam travels along the contour with an averaged line movement.

10 Claims, 2 Drawing Sheets

(51) Int. Cl.
  *B23K 26/03* (2006.01)
  *B23K 26/044* (2014.01)
  *G05B 19/402* (2006.01)

(56) References Cited

U.S. PATENT DOCUMENTS

| | | | | |
|---|---|---|---|---|
| 5,963,451 | A * | 10/1999 | Seki | G05B 19/4097 |
| | | | | 700/184 |
| 6,043,452 | A * | 3/2000 | Bestenlehrer | B23K 26/355 |
| | | | | 219/121.62 |
| 2010/0155375 | A1* | 6/2010 | Dietz | B23K 26/046 |
| | | | | 219/121.18 |
| 2010/0181165 | A1* | 7/2010 | Finn | B23K 37/0235 |
| | | | | 198/339.1 |
| 2013/0319980 | A1* | 12/2013 | Hesse | B23K 26/032 |
| | | | | 219/121.62 |
| 2015/0129563 | A1 | 5/2015 | Hodges et al. | |
| 2015/0190883 | A1 | 7/2015 | Erlwein | |
| 2016/0107272 | A1* | 4/2016 | Kraft | B23K 37/0452 |
| | | | | 219/124.4 |

FOREIGN PATENT DOCUMENTS

| | | |
|---|---|---|
| CN | 103586603 A | 2/2014 |
| CN | 105722631 A | 6/2016 |
| DE | 10 2004 039 9616 A1 | 3/2006 |
| DE | 102013203384 B4 | 7/2015 |

OTHER PUBLICATIONS

Beckhoff: "Beckhoff Information System—German", XP055419993, gefunden im Internet: URL:https//infosys.beckhoff.com/index.php?../content/1031/tcncl/125509122.html&id=, gefunden am Oct. 30, 2017, TwinCat NC I der Versind TwinCat 2.8, Index-Offset 0x00000050 und 0x00000051; 2002.

PCT International Search Report and Written Opinion of International Searching Authority dated Aug. 8, 2018 corresponding to PCT International Application No. PCT/EP2018/063432 filed May 23, 2018.

* cited by examiner

METHOD FOR DETECTING AND PROCESSING DEFINED CONTOURS DURING SEVERING OF A SOLID BODY BY MEANS OF A HIGH-ENERGY BEAM

CROSS-REFERENCES TO RELATED APPLICATIONS

This application is the U.S. National Stage of International Application No. PCT/EP2018/063432, filed May 23, 2018, which designated the United States and has been published as International Publication No. WO 2018/215500 A1 and which claims the priority of European Patent Application, Serial No. 17172421.4, filed May 23, 2017, pursuant to 35 U.S.C. 119(a)-(d).

BACKGROUND OF THE INVENTION

The invention relates to a method for severing a solid body, wherein a high-energy beam travels along a contour on a surface of the solid body facing the high-energy beam and herein produces a cutting gap, wherein a control unit that controls the severing has a function for detecting contour breaches and a function for avoiding contour breaches. The invention also relates to a control unit for carrying out such a method.

Nowadays, numerically controlled or computer-aided numerically controlled cutting machines are used to manufacture or cut metal sheets. A numerical control unit (NC) or a computer-aided numerical control unit (CNC)—hereinafter simply control unit—is a device for controlling machines that reads control commands held as a code on a data carrier and converts then into operational sequences or motional sequence. Recesses to be produced are held, described as contours, in a NC or CNC program—hereinafter NC program—within the control unit. The control unit also contains software that controls a path of the cutting machine according to the NC program.

Such cutting machines are used in different technical fields. For example, metal sheets for the automobile and shipbuilding industries are cut in this way. Especially cutting machines, that use high-energy beams, in particular laser or electron beams, to produce recesses in metallic workpieces are gaining in popularity.

For example, DE102004039916 A1 describes a method for producing a narrow recess, for example a bore, a cut or an engraving in a metallic workpiece with which a high-energy beam penetrates the workpiece and produces a melt.

To produce the recess, the high-energy beam travels along a contour hereby creating a cutting gap.

Modern control units are provided with monitoring functions intended to prevent damage to both the cutting machine and the workpiece. For example, it is possible to access a tool-workpiece-collision monitoring function—also called contour breach detection—which is generally integrated in a tool radius correction function, Herein, the cutting machine tool paths are monitored by predictive contour calculations. As a result, any possible contour breaches are detected in good time and can be prevented by the control unit by a function for avoiding contour breaches in that any contours that result in contour breaches are omitted. Herein, the contour breach detection detects contours with which, during the travel along the contour and the production of a cutting gap, more material is removed from the solid body than is actually intended.

Tool-workpiece-collision monitoring can also act as bottleneck detection. Herein, a bottleneck describes a contour that cannot be produced without a contour breach. If such a contour is travelled along and a cutting gap produced, more material will be abraded from the solid body than was originally intended.

If, for example, a contour or partial contour is to be removed from the workpiece with an entrance—entrance relates to the direction of travel of the high-energy beam—that is too small with respect to the diameter of the high-energy beam, the contour or a part of the contour is omitted as a result of the function for avoiding contour breaches. Since the accuracy of the control units is within the µm region or below, small differences in size of only 1 µm or less are sufficient for this, if the diameter of the high-energy beam is only slightly larger than the programmed contour, the contour is omitted.

It is possible to deactivate the contour breach avoidance manually before a contour that results in a contour breach but describes a recess that mandatorily has to be produced and with which deviations between the programmed and produced contour are not of decisive significance and to reactivate this again after the machining of the contour. However, this is associated with high costs.

The invention is based on the object of providing a simplified method with which a high-energy beam automatically also travels any contours that result in contour breaches and produces the recesses described by the contours.

SUMMARY OF THE INVENTION

The object is achieved by a method for severing a solid body, wherein a high-energy beam travels along a contour on a surface of the solid body facing the high-energy beam and herein produces a cutting gap, wherein a control unit that controls the severing has a function for detecting contour breaches and a function for avoiding contour breaches, wherein at least one defined contour is stored in the control unit, the defined contour is detected by the control unit and the contour breach avoidance is automatically deactivated.

The object is also achieved by a control unit for carrying out such a method, wherein the control unit has a function for detecting contour breaches and a function for avoiding contour breaches, wherein at least one defined contour can be stored in the control unit, the defined contour can be detected by the control unit and, when the contour is detected, the contour breach avoidance can be automatically deactivated.

The invention is in particular suitable for application when the solid body is severed by means of laser cutting—also known as laser beam cutting. Laser cutting methods include laser beam fusion cutting, laser beam gas cutting and laser beam sublimation cutting. However, such a method can also be used with other types of severing used in production engineering that involve changing the shape of a workpiece by abolishing cohesion locally. Examples of this include waterjet cutting, gas cutting and plasma fusion cutting or even conventional severing methods such as miffing.

According to the invention, the control unit is used to control a laser cutting machine.

Laser cutting is particularly suitable for severing solid bodies when complex contours require fast and virtually force-free machining. The laser beam enables burr-free cutting of even very narrow cutting gaps. Moreover, heat input into the solid body is low. In addition to metallic materials such as, for example, structural steel, stainless steel and aluminum, laser cutting is in inter alia also suitable for wood, plastic, glass and ceramics.

In one embodiment according to the invention, the control unit receives two essential items of information relating to the contours: at least one control command describing a contour recess and information relating to at least one defined contour, preferably a contour that results in contour breaches, describing a recess which must mandatorily be produced and may not be omitted. The control command is preferably held in a NC program and converted into an operational sequence by the control unit. According to the invention, the defined contour is stored in the control unit.

The defined contour preferably describes a recess in the form of a slot or bending slot. Bending slots are narrow slots, which, in an exemplary embodiment, have a width of approximately 0.1 mm to 1 mm and are a preferably produced in a metal sheet. They are in particular produced at the places in a metal sheet where the metal sheet is to be folded or bent.

Bending slots typically have contours that describe an I or a T. So-called I-slots and so-called T-slots can be rounded. However, one corner of the I- or T-slot generally has a rounding arising from a preferably round focal point of a laser also called a laser focal point. However, I- and T-slots are also deliberately rounded in order to reduce a notch effect on the slots or on their cut or notched contours or partial contours.

In particular defined contours that would be detected as bottlenecks and are therefore omitted are stored in the control unit. These in particular include I-slots and T-slots.

According to the invention, the control unit detects the defined contour stored within the NC program and deactivates the contour breach avoidance. The recess described by the defined contour is produced even if this was, for example, detected as a bottleneck and would have had to be omitted. However, since the defined contour has been stored in the control unit, the control unit automatically detects the defined contour automatically in the NC program and implements the operational sequence. The invention is integrated in the control unit as a function for slot shape detection.

According to the invention, only slots are stored as defined contours in the control unit. Herein, the shape is relevant. Slots are preferably characterized by three features: they are perfectly straight, have two parallel cutting lines and have a specific length-width ratio. Typically, a slot is longer than it is wide by a factor of 200 to 400.

The defined contour stored in the control unit does not necessarily describe a complete outline of a recess to be produced, for example a slot, but can also have only at least one item of information relating to at least one feature of the defined contour.

The invention is in particular directed at simplified handling of a cutting machine in order to reduce the workload and the associated costs for an end customer. The method according to the invention is in particular advantageous with laser cutting since the severing of solid bodies by means of a laser beam is deemed to be rather imprecise.

A diameter of the laser focal point of the laser cutting machine is closely related to thickness of a material to be machined, for example a metal sheet. As a general rule: the thicker the metal sheet, the more energy the laser requires to produce a recess or a slot. If more energy is required because, for example, the metal sheet is thicker, the diameter of the laser focal point increases. Therefore, a significant increase hi the diameter of the laser focal point must be expected if, instead of a metal sheet with, for example, a thickness of 0.1 cm, a metal sheet with, for example, a thickness of 10 cm is to be machined.

In one exemplary embodiment, if an increase in the thickness of the metal sheet from 0.5 cm to 1 cm causes the diameter of the laser focal point to be greater than the width of the contour of an I-slot present in the NC program, the control unit detects a bottleneck. The I-slot will not be produced as a result of the contour breach avoidance. However, according to the invention, the contour of the !-slot is stored as a defined contour in the control unit. If the control unit detects the stored defined contour, it automatically deactivates the contour breach avoidance and the contour is machined. Herein, the control unit preferably averages a line movement of the laser within the programmed contour of the I-slot in order to minimize errors and deviations. Herein, slight contour breaches of the I-slot can be tolerated. A cutting machine operating according to the prior art is not able to implement the I-slot, which was programmed for the 0.5 cm thick metal sheet with the 1 cm thick metal sheet, since the contour breach detection detects a bottleneck.

The machining accuracy of a laser cutting machine is often approximately 0.1 mm. However, the accuracy of the control unit is within the μm range and below. Ageing of a focal lens of a laser in the laser cutting machine also requires the laser focal point to be further increased in order still to be able to apply the desired energy. Therefore, μm-accuracy machining of the solid body is neither possible nor necessary with respect to said slots and bending slots.

The function for detecting contour breaches and the function for avoiding contour breaches can be provided as separate functions or combined in one function.

BRIEF DESCRIPTION OF THE DRAWING

The following describes and explains the invention in greater detail with reference to the exemplary embodiments depicted in the figures.

DETAILED DESCRIPTION OF PREFERRED EMBODIMENTS

Figure 1:
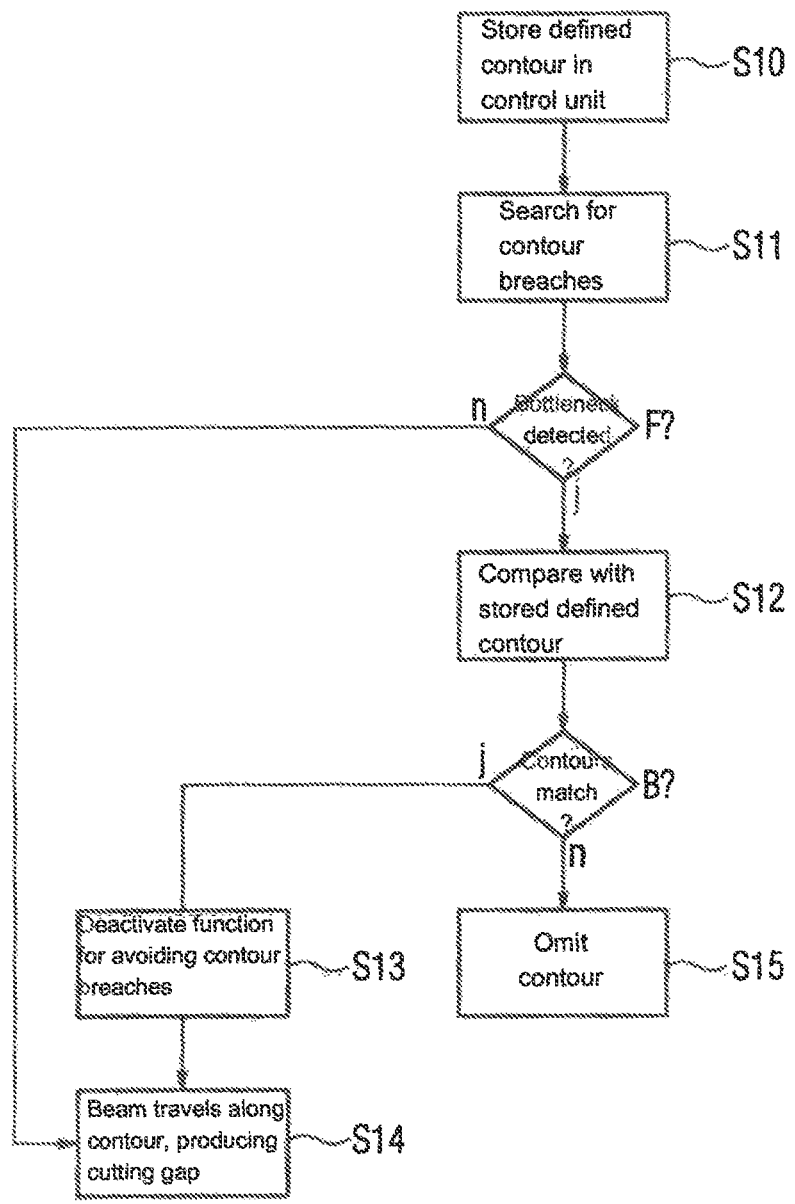
FIG. 1 shows an exemplary sequence of the method for severing a solid body.

FIG. 1 shows an exemplary sequence of the method for severing a solid body by means of a high-energy beam. A laser in a laser cutting machine is particularly suitable as a high-energy beam. In a method step S10, at least one defined contour or at least one item of information relating to at least one feature of the defined contour is stored in a control unit, which is preferably stored in the laser cutting machine. However, it is also possible for a plurality of defined contours to be stored. The stored defined contour is preferably a bending slot, in particular in the form of an I-slot, a T-slot, a rounded I-slot or a rounded T-slot. This contour is to be travelled along in each case and a cutting gap produced even if, after machining of the solid body, the cuffing gap produced is, for example, larger than that stored in the NC program and originally intended. In a method step S11, the control unit searches a NC program for contours that are detected by a contour breach detection as any contours that result in contour breaches, for example as a bottleneck. If no bottleneck is detected—identified in the figure by F? and n—in a method step S14, the high-energy beam travels along the programmed contour on a surface of the solid body facing the high-energy beam and herein produces a cutting gap. If a contour is detected as a bottleneck—identified in the figure by F? and y—this is compared in a method step S12 with the defined contours stored in the control unit as a result of the function for slot shape detection. If the contours match—identified by B? and y in the figure—the function for avoiding contour breaches is deactivated in a method step S13 and a cuffing gap produced in the method step S14. In order to keep a contour error as small as possible, the control unit also averages a line movement of the laser focal point. If the contours do not match—identified in the figure with B? and n—the contour is omitted, method step S15.

Figure 2:
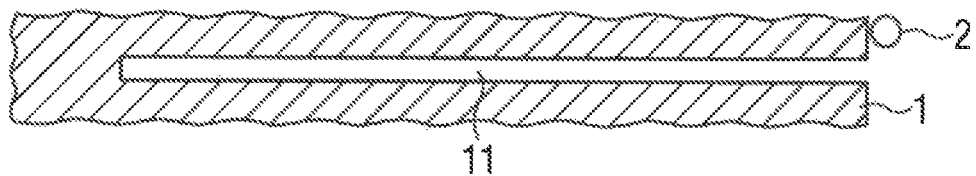
FIG. 2 shows a contour of a I-slot.

FIG. 2 shows a contour of a I-slot 11. A laser focal point 2 of a laser beam travels along the contour 11 on a metal sheet 1. In one exemplary embodiment, the laser focal point first travels along an upper portion of the contour and then along a lower portion. However, if, for reasons already explained, the diameter of the laser focal point 2 is exactly as wide or wider than the contour, the function for avoiding contour breaches in a laser cutting machine according to the prior art prevents the production of the cutting gap, According to the invention, the I-slot 11 is stored in the control unit, detected by the control unit as a defined contour as a result of the function for slot shape detection and a cutting gap produced. According to the invention, the control unit averages a line movement in order to keep errors and deviations from the contour programmed in the NC program as low as possible. This averaged line movement will be discussed in more detail with respect to FIG. 6.

Figure 3:
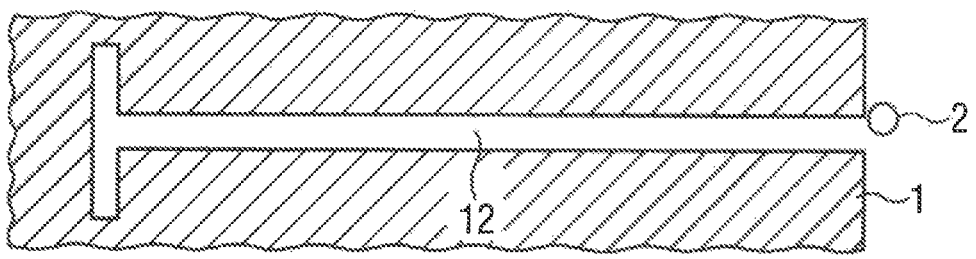
FIG. 3 shows a contour of a T-slot.

The same process is employed in FIG. 3 as that described for FIG. 2. FIG. 3 shows a contour of a T-slot 12. A laser focal point 2 of a laser beam travels along the contour 12 on a metal sheet 1. In one exemplary embodiment, the laser focal point first travels along an upper portion of the contour and then along a lower portion.

Figure 4:
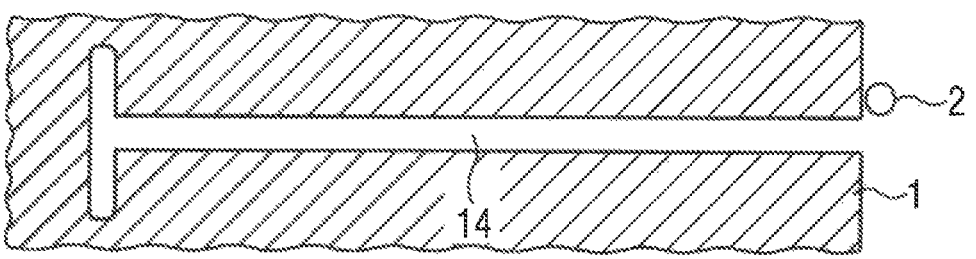
FIG. 4 shows a contour of a rounded I-slot.
Figure 5:
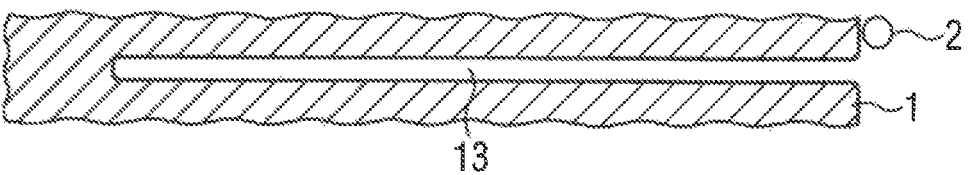
FIG. 5 shows a contour of a rounded T-slot.

FIG. 4 shows the T-shat 12 already explained in FIG. 3 as a rounded T-slot 14. FIG. 5 shows the I-slot 11 already explained in FIG. 2 as a rounded I-slot 13. However, the corners of the I- or T-slot generally have a rounding arising from a preferably round laser focal point 2, However, I- and T-slots are also deliberately rounded in order to reduce a notch effect on the slots or their cut or notched contours or partial contours.

The slots shown in FIGS. 2 to 5—I-slot, rounded I-slot, T-slot and rounded T-slot—are preferably available in a NC program as straight-line and/or circular segments in an NC or CNC parts-programming language.

Figure 6:
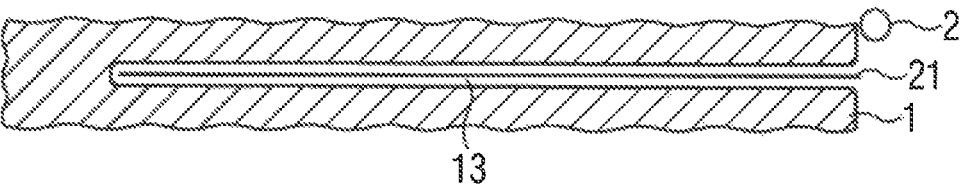
FIG. 6 shows an averaged line movement for achieving a rounded I-slot.

FIG. 6 shows the averaged line movement 21 of the laser focal point 2 of a laser cutting machine as the result of the method according to the invention, FIG. 6 shows the contour of a rounded I-slot 13 in a metal sheet 1. In this exemplary embodiment, the rounded I-slot 13 serves as a bending slot. Small contour errors and deviations are of little significance for bending slots. However, the end customer attaches importance to the fact that the bending slots are produced in all cases. However, the diameter of the laser focal point 2 is wider than the rounded I-slot 13, Due to the function for avoiding contour breaches, a control unit function according to the prior art would not travel along the contour and would not produce a cutting gap. Due to the function for slot shape detection, the method according to the invention enables the production of the cutting gap since the contour of the I-slot is detected by the control unit in which this contour was stored previously. In order nevertheless to keep the contour error as low as possible, the control unit according to the invention averages the line movement of the laser focal point 2. In FIG. 6, the laser focal point 2 travels along the line 21 going from right to left within the center of the contour. In one exemplary embodiment, an Islet with a programmed contour with a width of 0.3 mm, could ultimately be implemented as a cutting gap with a width of 0.4 mm. However, such slight contour breaches could be tolerated, hi particular with bending slots.

What is claimed is:

1. A method for severing a solid body, comprising:
storing in a control unit contours to be cut, wherein at least one of the stored contours is a defined contour that is required to be cut irrespective of a contour breach,
detecting with the control unit the stored defined contour;
automatically deactivating with the control unit avoidance of the contour breach when the contour to be cut matches the stored defined contour;
moving a high-energy beam having sufficient energy to cut through the solid body along the stored defined contour on a surface of the solid body, with the surface of the solid body facing the high-energy beam;
producing with the high-energy beam a cuffing gap in the solid body which cuts through the solid body;
omitting the contour to be cut when the contour on the surface of the solid body does not match the stored defined contour.

2. The method of claim 1, wherein the high-energy beam is a laser beam and the solid body is severed by laser cutting.

3. The method of claim 1, wherein the defined contour is specified in a NC program of the control unit.

4. The method of claim 1, wherein the control unit identifies the contour breach of the defined contour as a bottleneck.

5. The method of claim 4, further comprising moving the high-energy beam along a center of the defined contour with an averaged line movement, when the contour breach of the defined contour is defined as a bottleneck.

6. The method of claim 1, wherein the defined contour is implemented as a slot.

7. The method of claim 1, wherein the defined contour is implemented as an I-slot, a rounded I-slot, a T-slot or a rounded T-slot.

8. The method of claim 1, wherein the defined contour is implemented as a bending slot.

9. A control unit, comprising:
a memory storing contours to be cut, wherein at least one of the stored contours is a defined contour that is required to be cut irrespective of a contour breach, and
a first functionality detecting a contour breach and a second functionality for avoiding a contour breach,
wherein the control unit is configured to detect the stored defined contour and, when the contour breach is detected with the first functionality and the contour to be cut matches the stored defined contour, to automatically deactivate avoidance of the contour breach with the second functionality,
to cause a high-energy beam to produce a cutting gap in the solid body which cuts through the solid body along the stored defined contour, with a surface of the solid body facing the high-energy beam;
and when the contour breach is detected and the contour on the surface of the solid body does not match the defined contour, omit the contour.

10. The control unit of claim 9, further configured to control a laser cutting machine.

* * * * *